US005454892A

United States Patent [19]
Kardon et al.

[11] Patent Number: 5,454,892
[45] Date of Patent: Oct. 3, 1995

[54] METHOD OF MAKING AN IMPROVED ELECTROLUMINESCENT DEVICE

[75] Inventors: Donald R. Kardon, Ardmore; Charles H. Moore, King of Prussia; Douglas S. Bush, Oaks, all of Pa.

[73] Assignee: BKL, Inc., King of Prussia, Pa.

[21] Appl. No.: 221,504

[22] Filed: Apr. 1, 1994

Related U.S. Application Data

[62] Division of Ser. No. 709,350, Jun. 3, 1991.

[51] Int. Cl.$^6$ ............................ B05D 5/06; H05B 33/14
[52] U.S. Cl. ................. 156/67; 313/502; 427/66
[58] Field of Search .................. 156/67; 427/66, 427/215; 313/502; 252/301.36

[56] References Cited

U.S. PATENT DOCUMENTS

| | | |
|---|---|---|
| 2,857,541 | 10/1958 | Etzel . |
| 2,951,169 | 8/1960 | Faria . |
| 3,461,075 | 8/1969 | Manson . |
| 4,513,023 | 4/1985 | Wary ............................................ 427/66 |
| 4,560,902 | 12/1985 | Kardon ...................................... 313/502 |
| 4,826,727 | 5/1989 | Glaser ........................................ 428/403 |
| 4,882,517 | 11/1989 | Maruyama ................................ 313/502 |
| 5,069,815 | 12/1991 | Aoki ..................................... 252/301.36 |
| 5,080,928 | 1/1992 | Klinedirst .................................. 427/66 |

Primary Examiner—Michael W. Ball
Assistant Examiner—Daniel J. Stemmer
Attorney, Agent, or Firm—Joseeph W. Molasky & Associates

[57] ABSTRACT

An electroluminescent device in which water is an essential component. Water is incorporated into the encapsulated phosphor-binder and the dielectric binder to provide a device in which brightness and longevity are enhanced.

8 Claims, 2 Drawing Sheets

METHOD OF MAKING AN IMPROVED ELECTROLUMINESCENT DEVICE

This is a Division of application Ser. No. 07/709,350, filed Jun. 3, 1991.

This invention relates to an improved electroluminescent system and to a method for its manufacture. More particularly, this invention relates to an electroluminescent device characterized by improved brightness and an ability to resist the degradative effects of moisture.

BACKGROUND OF THE INVENTION

Electroluminescent devices contain phosphor and dielectric films interposed between conductive layers or electrodes at least one of which is transparent. When alternating current is applied the phosphor is activated and light is emitted. The degree of emitted light or brightness depends generally upon the voltage and the frequency of the applied current.

One difficulty with electroluminescent devices is their vulnerability to moisture. Phosphor presents a particular problem because it has a tendency to react with water, including moisture in the atmosphere so that within a relatively short period of time the phosphor degrades and loses its light-emitting capabilities. Traditional approaches to this problem include the coating of the phosphor layer with an impermeable polymer as, for example, a film of chlorotrifluoroethylene or the like; however, the results have not been rewarding.

In U.S. Pat. No. 4,097,776 Allinikov describes a method for producing an electroluminescent cell by coating the phosphor with a liquid crystal to form a water barrier. The phosphor particles are first added to a solution of liquid crystals to form a slurry and the resulting mixture is then stored at temperatures above the liquid crystal melting point. Upon removing the solvent the phosphor particles were found to be encapsulated within the liquid crystal where they are presumably insulated from moisture. However, when added to conventional binders as, for example, binders in which polyvinylbutyral is a principal component the liquid crystals deteriorate and lose their protective ability so that the resulting device fails in relatively short order.

In U.S. Pat. No. 4,513,023 Wary directs attention to the inherent hygroscopicity and sensitivity to moisture of the phosphor component and his understanding of this problem led him to encapsulate the phosphors within a polymeric binder. Specifically, Wary utilizes curable polymeric matrixes as binders and once the phosphor and polymer have been combined the polymer is treated with ultraviolet (uv) light in an inert atmosphere. The difficulty with this system is the tendency of uv-cured resins to degrade within relatively short operating periods.

In U.S. Pat. No. 4,560,902 Kardon discloses an adhesive-type binder for protecting the phosphor particles from moisture. This binder system is an epoxy type polymer derived from epihalohydrins, bisphenols and urethane resins.

Although the Kardon system represents an advance in the art it too has been found wanting because over a period of time the presence of moisture results in impairment of the phosphor and decomposition of the electrodes.

Accordingly, there remains a need for electroluminescent lamps which possess improved resistance to moisture and which exhibit an improved brightness and longevity when compared to conventional devices.

SUMMARY OF THE INVENTION

It has been found that phosphor particles encapsulated in alumina may be combined with binder systems in which water is an essential component. Since water is ordinarily avoided in electroluminescent lamps it has come as no small surprise to find that the addition of water to an encapsulated phosphor system results in a lamp having improved capabilities.

DETAILED DESCRIPTION OF THE INVENTION

Figure 1:
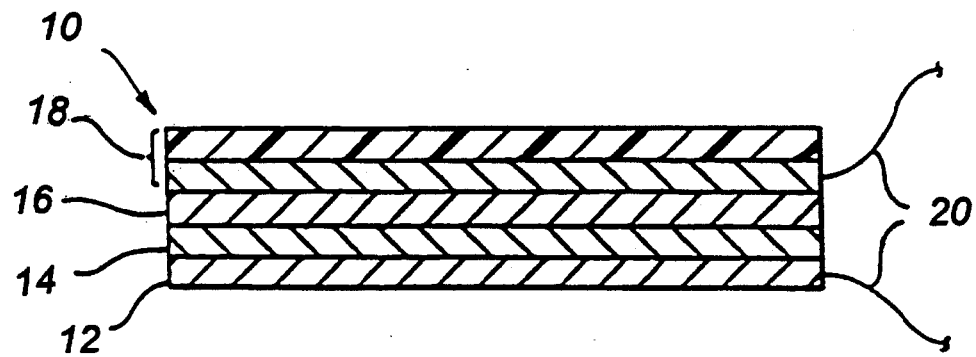
FIG. 1 is a cross sectional view of an electroluminescent device of this invention.

It has been found that electroluminescent lamps in which the phosphor particles are encapsulated by alumina exhibit an improved effectiveness when water is present. Not only is brightness increased but longevity is extended beyond that of conventional systems.

That an electroluminescent device should include water is contrary to conventional wisdom. The prior art is replete with warnings to the effect that water in all forms is to be avoided and the patent literature bears testimony to the efforts made to avoid the disadvantages attributed to water in electroluminescent cells.

Applicant does not profess to understand the basis for this surprising discovery but there is reason to believe that in this instance water improves conductivity and/or the capacitance of the electroluminescent cell by increasing the electrolytic properties of the system. This result is believed due to the polarity of the water molecules which impart to the binder system a similar polarizing effect. As a result it is believed that a concomitant increase in conductivity occurs including an improved flow of electrons between the electrodes so that the cell can provide light emissions of enhanced intensity.

Although the present invention envisions broadly the addition of water to electroluminescent systems this concept has particular application to systems in which the phosphor particles are encapsulated by alumina.

The device of this invention is physically constructed according to procedures which are known in the art and the dielectric or barium titanate layer is prepared by conventional means. Specifically, the dielectric layer is formulated by admixing barium titanate solids with a suitable solvent as, for example glycol ethers, alkyl ketones and aromatic solvents. Suitable glycol ethers include propylene glycol methyl ether, dipropylene glycol methyl ether, tripropylene glycol methyl ether, ethylene glycol ethyl ether, diethylene glycol butyl ether and the like. Suitable alkyl ketones include ketones such as lower alkyl ketones including acetone, methyl ethyl ketone, ethyl ketone and methylisobutyl ketone and the like. Suitable aromatic solvents include toluene, xylene and the like.

The amount of barium titanate which is added to the glycol ether or other solvent is preferably about 70–90% by weight. The barium titanate and the solvent are stirred together to form a homogeneous slurry. To this slurry is added from 10–30 parts of a binder, also in a like solvent. After mixing thoroughly, the barium titanate-binder-solvent slurry is deposited onto a metal foil or other electrode, suitably with a doctor blade, and dried. The thickness of the resultant barium titanate/resin binder layer on the electrode is about 0.2–6 mils.

The alumina encapsulated phosphor particles are also admixed with a suitable solvent. Useful phosphors are luminescent under the influence of an electric current and include zinc sulfide, zinc oxide or zinc sulfide activated with a metal such as manganese, copper, copper/lead or copper/manganese mixtures. The amount of phosphor added to the solvent can range suitably from about 60–95% by weight of the mixture, and is preferably from about 75–85% by weight. The light emitted by the electroluminescent cell is at least partially dependent upon the particle size and concentration of phosphor in the polymeric binder. The maximum amount of alumina encapsulated phosphor is added consistent with there being sufficient amount of binder present to form a layer of the desired thickness. After mixing well, from 5–40 parts of a binder is added to the phosphor slurry which is then deposited onto a transparent electrode in known manner.

Suitable binders are well known and include epoxy resins, polystyrene, polyethylene, polyvinyl butyral, polyvinyl chloride, polyvinyl acetate, polyvinyl alcohol, polyesters, polyamides, polyacrylonitrile, polyacrylate, polymethylmethacrylate and the like. Preferably, the binder can be an adhesive thermoplastic reaction product of phenols and an excess of an epihalohydrin. Suitable phenols include bisphenol A, dichlorobisphenol A, tetrachlorobisphenol A, tetrabromobisphenol A, bisphenol F and bisphenol ACP. The reaction is carried out in the presence of a glycol ether or other suitable solvent. To this reaction product is added a resin such as a urethane or an epoxy resin in the range of from about 5–6 parts of resin to about 1 part of the epihalohydrin/phenol reaction product. This binder is described in U.S. Pat. No. 4,560,902 to Kardon. Within this series one type of resin which has been found to be particularly useful in preparing binder systems is the following:

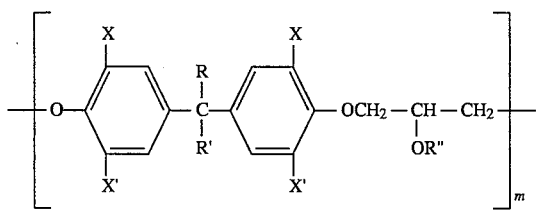

wherein R and R' can be independently hydrogen, lower alkyl and mononuclear aryl; X and X' are independently hydrogen, lower alkyl, or halogen; R" can be hydrogen or a cyanoloweralkyl, for example, straight or branched chain lower alkyl of 1–5 carbon atoms; and m is an integer greater than 1.

Another preferred binder system is a cyanoalkylated pullulan polymer of the formula:

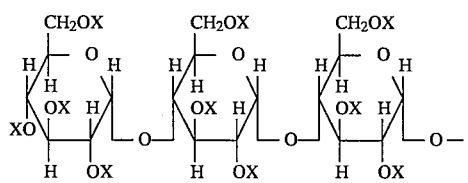

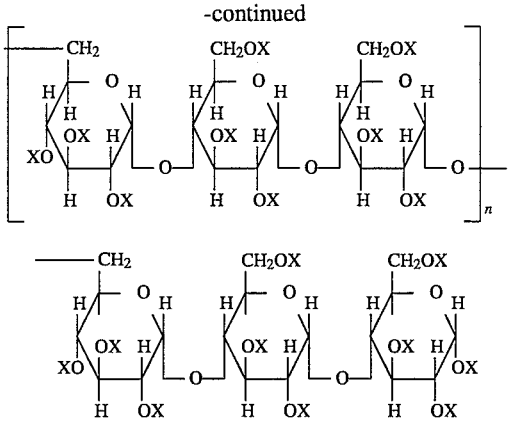

wherein n is an integer of from about 20 to about 4000, and X at each occurrence independently is hydrogen or lower cyanoalkyl, i.e., $C_1$ to $C_5$ alkyl; however, X is preferably hydrogen, cyanomethyl or cyanoethyl. This binder system is described in a copending application of Kardon et al, Ser. No. 664,824, filed Mar. 5, 1991, and incorporated by reference herein.

Water can be added to the binder system at this step or following assembly of the electroluminescent device. A small amount of water, at least 1 part per million (hereinafter, ppm) by weight of the binder, is added to the phosphor/binder and barium titanate/binder slurries. The water can be stirred into the slurries before or after the solvent is removed.

The amount of water added to the binder will vary somewhat in accordance with the amount of water the particular binder employed can absorb. At least about 1 ppm of water should be present (0.0001%) and up to the maximum amount of water the binder will absorb. For example, cyanoethyl polyvinyl alcohol binders can absorb a maximum of about 40,000 ppm (4.0%) of water. Binders comprised of cyanoalkylated pullulan polymers can absorb up to about 100,000 ppm (10.0%) of water. In general, the preferred range of water added to the binder to enhance performance of the electroluminescent lamp will be from about 500 ppm (0.05%) to about 20,000 ppm (2.0%). If too much water is added, corrosion of the electrodes may occur, leading to oxidation-reduction reactions with the result that the metallized conductive plates will no longer act as a conductor of electricity between the two conductive plates of the capacitor.

The phosphor/binder and barium titanate compositions thus obtained are then deposited onto their respective electrodes in the known manner.

The electrode for the phosphor/binder layer is a transparent electrode, which can be a transparent plastic film or sheet such as polyethylene, polypropylene, polyethylene terephthalate, polyvinyl chloride, polymethylmethacrylate and the like, or glass. The transparent film or glass is then coated with a transparent conductive film, such as an indium-tin oxide or gold film according to known methods. The electrode for the barium titanate/binder may be a conductive metal, such as aluminum, gold, silver, copper and the like, in a variety of thicknesses, from a thick sheet to a thin foil. This electrode also can be deposited onto a like plastic film or sheet. The phosphor/binder and barium titanate/binder slurries described above are then deposited onto their respective electrodes by spray coating, roller coating, painting or hot pressing, as well as with a doctor blade. A suitable thickness for the phosphor/binder layer when dried is about 0.2–6 mils.

The two parts of the electroluminescent cell as described above, ie., the barium titanate/binder layer on a metal electrode and the alumina encapsulated phosphor/binder layer on a transparent electrode, are assembled by hot pressing at temperatures in the range of about 150°–400° F. at a pressure of from about 5–100 psi for a period of about 0.1 to 2.0 seconds. Electrical leads or connections are made to the electrodes and these are connected to a source of alternating current. When an electrical current is passed across the electrodes, the phosphor particles are activated and light is emitted.

Alternatively, the addition of water to the binder can be achieved by placing the device described above in a high moisture content environment as, for example, a chamber having a relative humidity of 70–100% until the desired concentration of water is absorbed.

The electroluminescent device of this invention is further illustrated by FIG. 1. The assembled device 10 comprises a barium titanate/binder layer 14 deposited onto an aluminum foil 12. An alumina encapsulated phosphor/binder layer 16 is deposited onto an indium-tin oxide coated polymer film 18. Leads 20 complete the device 10.

The moisture saturated electroluminescent device of this invention exhibits increased brightness and longer lifetimes when compared against conventional systems. They also have the advantage of ease of manufacture because the alumina encapsulated phosphor particles need not be isolated from moisture during preparation of the phosphor layer. The electroluminescent devices of this invention also can be made of less expensive binder or barrier systems because the need of improved impermeability of the binder to moisture is no longer required. Further, the leads can be made less expensively, using punch-through terminations, because the need for complete encapsulation of the devices and protection from ambient moisture has been eliminated.

The invention will be further described in the following Examples, but the invention is not meant to be limited to the details described therein. In the Examples, parts are by weight.

EXAMPLE 1

Control v Product: Zinc sulfide phosphor activated with copper was coated with alumina (29.25 parts) and then admixed thoroughly with a solvent to form a slurry containing 19.0% solids. This slurry was added to 20.0 parts of a binder slurry containing 34.4% of a cyanoethylpolyvinyl alcohol binder to give a final slurry containing 74% of solids. The viscosity was adjusted by adding 0.45 part of the mixed solvent.

The resultant slurry was drawn with a doctor blade onto an indium-tin oxide film on a 2 mil thick polyethylene terephthalate film. After drying for 5 minutes at 150° C., the coating thickness was 1.80 mil.

The adhesion of the coating on the film was excellent and the resulting product (Product I) presented a grainy appearance.

A control phosphor slurry was made in similar fashion using 29.32 parts of unencapsulated zinc sulfide phosphor particles activated with copper in 20.05 parts of the binder slurry. The viscosity was adjusted by adding 0.46 parts of the mixed solvent.

The adhesion of the coating on the film was very good, with a smooth appearance.

The above coated films were laminated to a standard barium titanate/binder layer at a temperature of about 315° F. at a speed of 4.0 feet per minute of the feed film. Individual cells were cut and leads attached in the known manner.

The resultant electroluminescent devices were connected to a power supply at 75 V/600 Hz and the initial brightness measured. The results are summarized in Table I below:

TABLE I

| Sample | Brightness, foot lamberts |
| --- | --- |
| Product I | 5.1 |
| Control | 7.6 |

Thus the initial brightness of the device using the alumina encapsulated phosphor was lower than for the unencapsulated phosphor of the Control.

The above devices were exposed to ambient conditions for 72 hours. The results are summarized in Table II below:

TABLE II

| Sample | Brightness, foot lamberts |
| --- | --- |
| Product I | 4.5 |
| Control | 5.8 |

Thus both devices deteriorated somewhat over time after exposure to moisture.

The above devices were exposed to ambient conditions for up to 168 hours, with brightness measured at intervals. The results are summarized in Table III below:

TABLE III

| Sample | Brightness, foot lamberts | | | |
| --- | --- | --- | --- | --- |
|  | 96 hours | 120 hours | 144 hours | 168 hours |
| Product I | 4.2 | 4.4 | 4.4 | 4.3 |
| Control | 5.3 | 5.1 | 5.0 | 4.7 |

On the basis of this study it was apparent that the devices stabilized to a large degree after initial deterioration. Examination of the devices after 240 hours showed that the lamp of Example 1 (Product I) showed no discoloration and became smoother looking than it was originally. The control device, however, appeared very gray and showed signs of ingression into the phosphor along its edges.

EXAMPLE 2

Control v Product: The procedure of Example 1 was repeated except that 33.17 parts of the alumina encapsulated phosphor was added to a slurry containing 38.9% of binder solids and a binder composition consisting of cyanoethyl pullulan resin and cyanoethylpolyvinyl alcohol was employed. The Control was prepared with 33.32 parts of phosphor.

The coated phosphor layer was 1.80 mil thick and had excellent adhesion to the electrode with a grainy appearance (Product II). The Control phosphor layer had very good adhesion to the electrode and was smooth in appearance.

The devices made from the above phosphors were tested under a power supply of 75 V at 600 MHz. The initial brightness was measured and these values are shown in Table IV below:

TABLE IV

| Sample | Brightness, foot lamberts |
| --- | --- |
| Product II | 18.2 |
| Control | 26.1 |

Again, the device made from the alumina encapsulated phosphor was not as bright initially as the Control device.

The devices were exposed to ambient conditions for up to 72 hours with periodic measurement of brightness. The results are summarized below in Table V.

TABLE V

| | Brightness, foot lamberts | | | |
| --- | --- | --- | --- | --- |
| Sample | 5 hours | 23 hours | 52 hours | 72 hours |
| Product II | 16.2 | 13.5 | 12.5 | 12.0 |
| Control | 23.3 | 14.1 | 12.5 | 11.6 |

Figure 2:
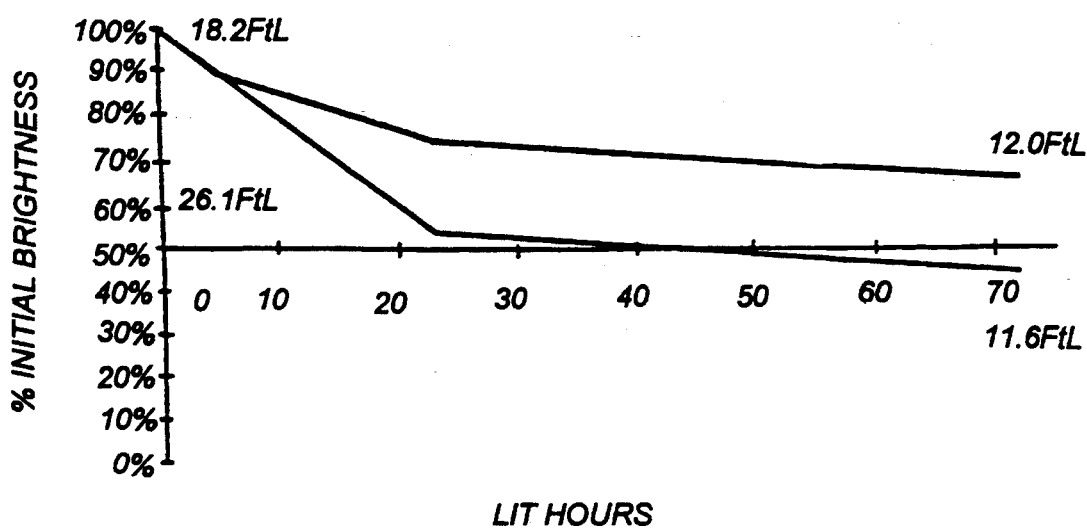
FIGS. 2–4 present a comparison of the electroluminescent device of the present invention with controls as a function time and brightness.

Thus while both devices deteriorated with time, the Control deteriorated faster. The results are presented graphically in FIG. 2.

The devices were exposed to ambient conditions for up to 408 hours with periodic measurement of brightness. The results are summarized below in Table VI.

TABLE VI

| | Brightness, foot lamberts, hours | | | | | | |
| --- | --- | --- | --- | --- | --- | --- | --- |
| Sample | 96 | 120 | 144 | 168 | 240 | 336 | 408 |
| Product II | 11.6 | 11.3 | 11.2 | 10.9 | 10.4 | 11.8 | 11.2 |
| Control | 11.6 | 10.0 | 9.9 | 9.0 | 8.2 | 8.0 | 7.9 |

Figure 3:
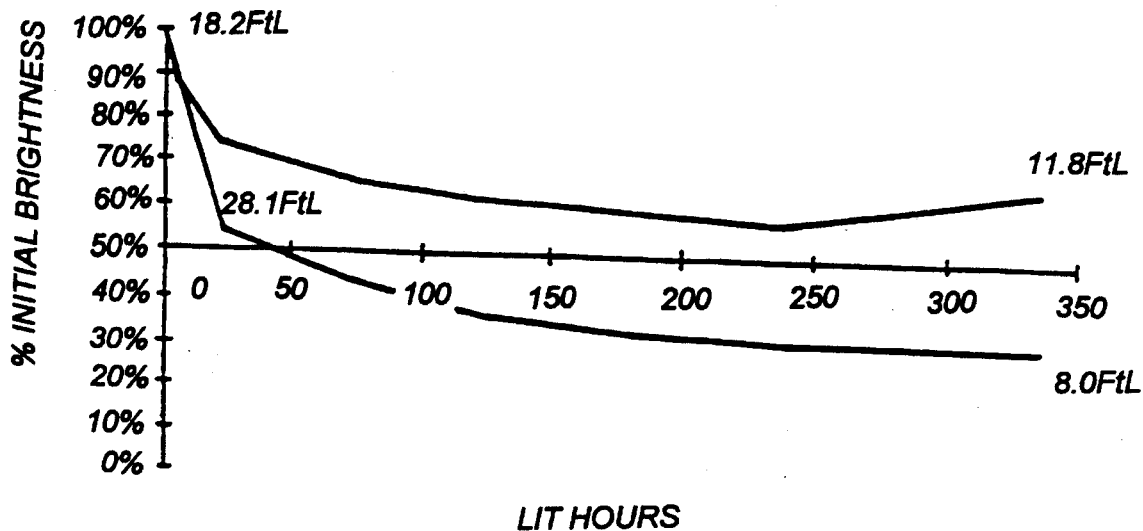

The results are presented graphically in FIG. 3 which shows a gradual deterioration in both devices with time after the initial, more rapid, deterioration.

EXAMPLE 3

Devices made in accordance with the procedure of Example 2 were placed in a chamber having a relative humidity of 100%. The resulting device (Product III) had an initial brightness of 18.4 foot-lamberts, whereas, the Control had an initial brightness of 24.2 foot-lamberts. The moisture content of the binder was also measured. The devices were exposed to high relative humidity for 120 hours. The results are summarized below in Table VII:

TABLE VII

| | Brightness, foot-lamberts, hours | | | | Moisture Content, ppm, hours | |
| --- | --- | --- | --- | --- | --- | --- |
| | 8 | 24 | 96 | 120 | 0 | 24 |
| Product III | 19.8 | 23.6 | 21.6 | 21.3 | 439 | 5029 |
| Control | 7.2 | 1.5 | 0.0 | — | 418 | 4662 |

Figure 4:
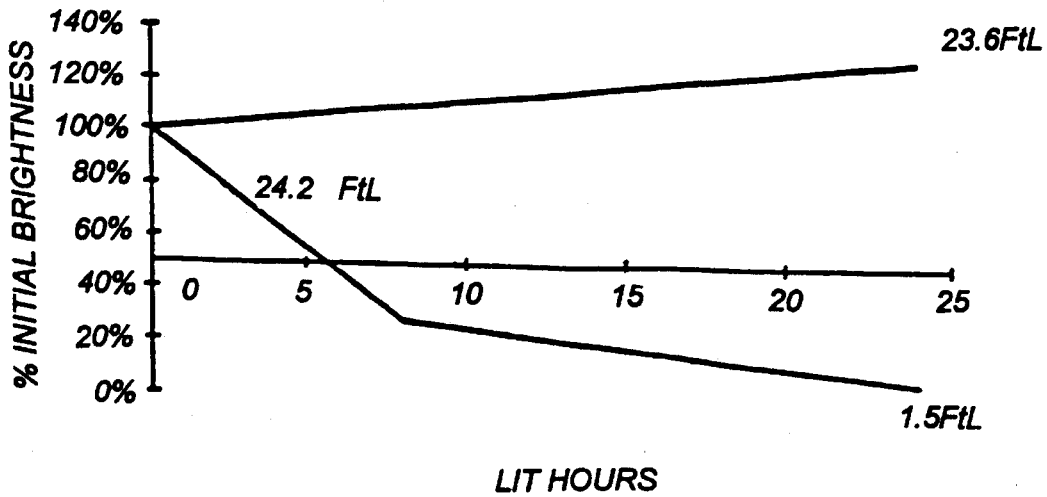

Thus, the Control devices deteriorated very rapidly in a high humidity environment, whereas, the devices of the invention improved in brightness upon exposure to high humidity. The results are presented graphically in FIG. 4.

After four days in the high humidity chamber, the Control device was unlit. The phosphor showed evidence of ingression from the edges and was dark grey in many areas. The barium titanate layer had become loosened from the alumina electrode and the aluminum had migrated away from the polyester backing in several places. Areas around the edges of the phosphor were nearly black.

The moisture-containing device of this Example (Product III), however, was still bright, and the phosphor layer was smoother than it was initially. There were some areas which were unlit along the edges of the device due to migration of the aluminum away from the polyester backing, but they were minor compared to the Control.

This invention has been described by reference to precise embodiments but it will be appreciated by those skilled in the art that this invention is subject to various modifications and to the extent that those modifications would be obvious to one of ordinary skill they are considered as being within the scope of the appended claims.

What is claimed is:

1. A method for making an electroluminescent device having improved brightness and longevity which comprises:

(a) admixing alumina encapsulated phosphor particles with a polymeric binder, (b) forming a phosphor/binder layer by depositing the mixture of step (a) onto a transparent electrode, (c) admixing barium titanate with a polymeric binder, (d) forming a barium titanate/binder layer by depositing the mixture of step (c) onto a metallic electrode, (e) laminating the transparent electrode of step (b) with the metallic electrode of step (d) to form an electroluminescent device, and (f) incorporating into the phosphor/binder layer and the barium titanate/binder layer about 500 to 20,000 parts per million of water by weight by subjecting said device to a high moisture containing environment.

2. The method according to claim 1 wherein said alumina encapsulated phosphor particles and said polymeric binder of step (a) are admixed in the presence of a solvent to form a slurry.

3. The method according to claim 1 wherein said barium titanate and said polymeric binder of step (c) are admixed in the presence of a solvent to form a slurry.

4. The method according to claim 1 wherein the polymeric binder of steps (a) and (c) is the same or different and are selected from the group consisting of:

a.) a cyanoalkylated pullulan of the formula:

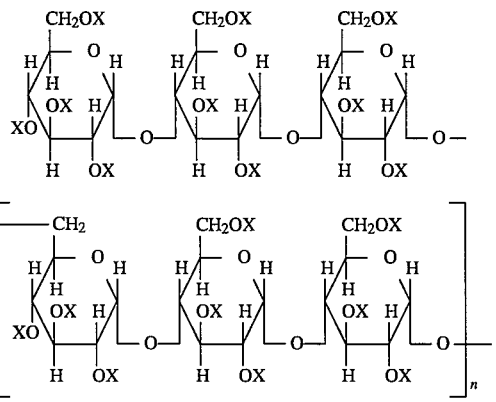

-continued

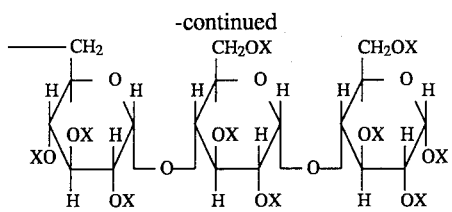

wherein X is a hydrogen or cyanoloweralkyl and n is an integer having a value of from about 20–4000;

b.) a cyanoalkylated epoxy resin of the formula:

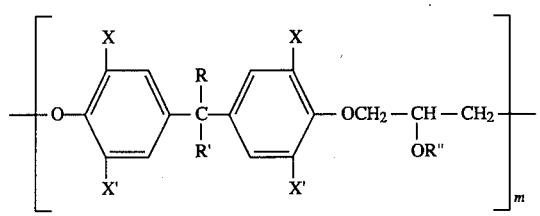

wherein R and R' are the same or different members selected from the group consisting of hydrogen, lower alkyl and mononuclear aryl; R" is hydrogen or cyanoloweralkyl; X and X' are the same or different members selected from the group consisting of hydrogen, lower alkyl and halogen; and m is an integer greater than 1;

c.) a mixture of cyanoalkylated polymers of the group consisting of cyanoalkylcellulose, cyanoalkylpolyvinyl alcohol, cyanoalkylsucrose, cyanoalkylhydroxycellulose and cyanoalkylated epoxy resin;

d.) a mixture of said cyanoalkylated pullulan with said cyanoalkylated epoxy resin; and e.) a mixture of said cyanoalkylated pullulan with a cyanoalkylated polymer of the group consisting of cyanoalkylcellulose, cyanoalkylpolyvinyl alcohol, cyanoalkylsucrose, and cyanoalkylhydroxycellulose.

5. A method for making an electroluminescent device having improved brightness and longevity which comprises:

(a) admixing alumina encapsulated phosphor particles with a polymeric binder, (b) adding from about 500 to about 20,000 parts per million by weight of water to the mixture of step (a), (c) forming a phosphor/binder layer by depositing the mixture of step (b) onto a transparent electrode, (d) admixing barium titanate with a polymeric binder, (e) adding from about 500 to about 20,000 parts per million by weight of binder of water to the mixture of step (d), (f) forming a barium titanate/binder layer by depositing the mixture of step (e) onto a metallic electrode, and (g) laminating the transparent electrode of step (c) with the metal electrode of step (f) to form an electroluminescent device.

6. The method according to claim 5 wherein said alumina encapsulated phosphor particles and said polymeric binder of step (a) are admixed in the presence of a solvent to form a slurry.

7. The method according to claim 5 wherein said barium titanate and said polymeric binder of step (d) are admixed in the presence of a solvent to form a slurry.

8. The method according to claim 3 wherein the polymeric binder of steps (a) and (d) are the same or different and are selected from the group consisting of:

a.) a cyanoalkylated pullulan of the formula:

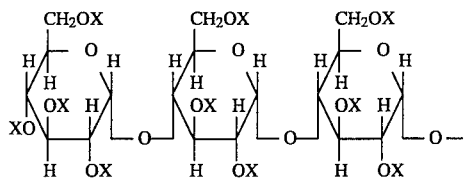

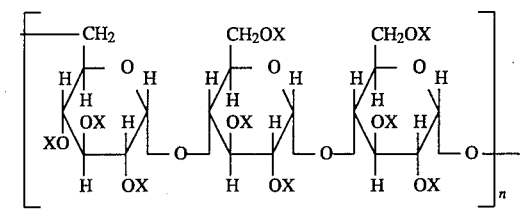

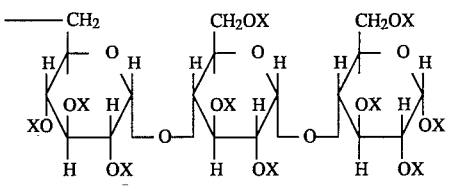

wherein X is a hydrogen or cyanoloweralkyl and n is an integer having a value of from about 20–4000;

b.) a cyanoalkylated epoxy resin of the formula:

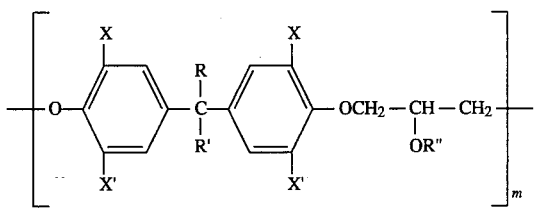

wherein R and R' are the same or different members selected from the group consisting of hydrogen, lower alkyl and mononuclear aryl; R" is hydrogen or cyanoloweralkyl; X and X' are the same or different members selected from the group consisting of hydrogen, lower alkyl and halogen; and m is an integer greater than 1;

c.) a mixture of cyanoalkylated polymers of the group consisting of cyanoalkylcellulose, cyanoalkylpolyvinyl alcohol, cyanoalkylsucrose, cyanoalkylhydroxycellulose and cyanoalkylated epoxy resin;

d.) a mixture of said cyanoalkylated pullulan with said cyanoalkylated epoxy resin; and e.) a mixture of said cyanoalkylated pullulan with a cyanoalkylated polymer of the group consisting of cyanoalkylcellulose, cyanoalkylpolyvinyl alcohol, cyanoalkylsucrose, and cyanoalkylhydroxycellulose.

* * * * *